United States Patent [19]

Carreras

[11] Patent Number: 4,604,892
[45] Date of Patent: Aug. 12, 1986

[54] DEVICE FOR THE AUTOMATIC CONTACTLESS MEASUREMENT OF THE VOLUME OF A LAYER DEPOSITED ON A SUBSTRATE

[76] Inventor: Michelle Carreras, 81 rue de Paris, St. Rémy les chorreuse 78470, France

[21] Appl. No.: 641,965
[22] PCT Filed: Dec. 8, 1983
[86] PCT No.: PCT/FR83/00246
 § 371 Date: Jul. 27, 1984
 § 102(e) Date: Jul. 27, 1984
[87] PCT Pub. No.: WO84/02394
 PCT Pub. Date: Jun. 21, 1984

[30] Foreign Application Priority Data

Dec. 10, 1982 [FR] France .................. 82 20723

[51] Int. Cl.⁴ .................................. G01B 13/02
[52] U.S. Cl. ................................................ 73/37.5
[58] Field of Search ............................. 73/37.5, 37.6

[56] References Cited

U.S. PATENT DOCUMENTS

| | | | |
|---|---|---|---|
| 2,891,686 | 6/1959 | Roberson et al. | 73/37.5 |
| 2,953,918 | 9/1960 | Fowler et al. | 73/37.5 |
| 3,213,670 | 10/1965 | MacGeorge | 73/37.6 |
| 3,495,442 | 2/1970 | Rejsa | 73/37.6 |
| 3,757,563 | 9/1973 | Kampf et al. | 73/37.5 |
| 3,948,082 | 4/1976 | Zumbach et al. | 73/37.5 |
| 4,364,270 | 12/1982 | Heinzl et al. | 73/37.5 |

FOREIGN PATENT DOCUMENTS 842045 7/1960 United Kingdom .

OTHER PUBLICATIONS

Kahwati, Research Disclosure No. 137, 9-1975.

Primary Examiner—Stewart J. Levy
Assistant Examiner—Hezron E. Williams
Attorney, Agent, or Firm—Norman Lettvin

[57] ABSTRACT

An apparatus and process are disclosed for the contactless measurement of the volume of a layer of wet, electrically resistive material that is deposited on a rigid substrate support, where the deposit of said electrically resistive material has a known length and width. The apparatus measures the topological thickness of the deposit of electrically resistive material by means of a pneumatic gas system that has an outlet, positioned above the deposit on the substrate, through which a jet of gas under pressure is directed downwardly against the deposit and the substrate. The outlet for the pneumatic gas jet is constructed to be homothetic to the width and length of the deposit. An apparatus is provided for selectively moving and changing the position of the deposit and its support relative to the pneumatic gas system, so that the gas jet may be sequentially directed either at the deposit or the bare substrate while a constant pressure measurement is maintained, whereby to determine the difference in distances from the gas jet outlet to the upper surface of the deposit or to the bare substrate, so as to obtain a measure of the topological thickness of the deposit.

10 Claims, 5 Drawing Figures

DEVICE FOR THE AUTOMATIC CONTACTLESS MEASUREMENT OF THE VOLUME OF A LAYER DEPOSITED ON A SUBSTRATE

BACKGROUND OF THE INVENTION

1. Field of the Invention

The present invention relates to a device for the automatic measurement without contact of the volume of a layer deposited on a substrate. It applies to deposits formed for electronic circuits by hybrid microelectronic technologies.

With the device of the invention, the equivalent of a volume can be measured; we could just as well measure a thickness, we would then have much richer information than the measurement of the thickness alone. The "thickness" measured could be called in this case "topological thickness".

2. Description of the Prior Art

In a general way it is known that a hybrid circuit for example is formed from an electrically insulated substrate on which are deposited different layers of electricity conducting, linearly resistive or not, dielectric or insulating materials.

If we take the case of resistances obtained from resistive inks deposited on a substrate, the thickness of the deposit needs to be accurately controlled for it determines the final value of the resistance according to the conventional equation:

$$R = \rho(L/S) \qquad \text{Equation (1)}$$

R: resistance
$\rho$: resistivity of the material
L: length of the resistance
s: section of the resistance If we consider that the resistance is rectangular in section, we may write:

$$s = 1 \times e$$

with
l: width of the resistance
e: thickness of the resistance.

We may therefore write, supposing $L/1 = N$ (number of squares)

$$(1/R) = e/\rho N \qquad \text{Equation (2)}$$

Since $\rho$ and N are constants, it can be seen that the value of the resistance is directly related to that of the thickness: $1/R = f(e)$.

Up to now, the technician corrects his process by measuring (e). Now at least three basic problems arise from this way of operating:

1. It is necessary to measure the thickness as soon as the deposit has been formed, i.e. according to the terms used in the technique, to measure in the "wet" or "raw" state, so as not to wait for the end of the procedure (about 60 to 90 minutes later) and risk throwing away a large number of the substrates because they are outside the values.

2. The technician knows that the term thickness is extremely vague and canot be more imprecise. In fact, the shape of the deposit is not a parallelepiped and only Equation (1) is applicable since it only considers the section of the resistive element without making assumptions as to the shape of this section. Now, all the manufacturers of silk-screen printed hybrid circuits use the Equation (2) because the thickness is the only measurement which they may apprehend. It can be seen in FIG. 1 that this is an illusion and that no fine correlation can be obtained between this measurement of the layer thickness "e" (FIG. 1) and the value of the resistance obtained after baking and that consequently silk-screen printing systems cannot be built which would be self correcting and which would thus be really automatic. Depending on the widths of the resistances, and their length, different shapes in section may be obtained; these result from the balance of the surface tension forces and the forces of gravity. Consider what information can the measurement of "e" (illustrated at the left of FIG. 1) give in the case of a resistance, e.g. in the case of resistance 2 of small width 11 ($\leq$1 mm), or that of a resistance 3, or that of resistance 4 for which 13 (seen in FIG. 1) is approximately greater than 2 mm and is greater than 12.

3. The methods for measuring the thickness used at present do not even allow the section, or average, thickness to be measured.

The solutions known at present are not adapted to the problem of measuring the thicknesses of silk-screen printed deposits or deposits made by another method. The different methods of measurement at present available may be presented by showing their limits, which will more clearly bring out the advantage of the present invention.

Measurement by a fluorescence RX, though it is effectively without contact, is however related to the nature of the atoms forming the layer. Now in so far as resistive inks are concerned, from the low values (a few ohms per square) to very high values (a few tens of megohms per square), their composition is essentially variable. Finally, the measurement takes between 5 and 30 seconds.

Measurement by back-scattering of beta rays comes up against the same difficulty as stated before since it depends directly on the composition of the material deposited. Generally, a difference of 20% in the atomic numbers of the atoms forming the substrate and the deposit is furthermore required; this prohibits measurements on the dielectric and insulating material.

Measurement by Eddy currents requires either non conducting deposits on non magnetic metals or conducting deposits on less conducting substrates. These limits prohibit it generally for use within hybrid microelectrics, principally when it is desired to make a wet measurement which is the purpose of the servo-control of the silk-screen printing machines.

Magnetic induction only relates to non conducting deposits on a magnetic substrate, so it is then in general not useable.

Ellipsometry and spectrophotometry, generally used in the measurement of the thickness of oxides and nitrides, are not at all adapted to the types of deposits used in hybrid microelectronics.

The methods based on Hall's effect, measurement of the microresistance or coulometric measurement are adapted to metals but not to ceramic materials and moreover they are not compatible with "wet" state measurement.

Profilometers are widely used in hybrid microelectronics but, on the one hand, they do not allow wet measurement, and on the other hand the measurement is very localised, since only a section is available in a given plane and not the whole of the volume. Finally, they are slow and difficult to integrate in an automatic measurement chain.

Optical section microscopes are also widely used in hybrid microelectronics as they provide contactless measurement, but they present numerous drawbacks. They require optical focusing which complicates the automation and, on the other hand, their field is very limited and it is impossible by construction to display the whole of a section even for a width as small as 1 mm.

SUMMARY OF THE INVENTION

The purpose of the present invention is to overcome all these disadvantages by providing an automatic contactless measuring principle for measuring not just a simple thickness, but a topological thickness equivalent to a volume. We saw with Equation (1) that R is inversely proportional to the section; but the volume (V) may be introduced into this Equation while admitting as a first approximation the Equation: $V = s \times L$ (the section "s" being of any shape whatsoever). We obtain an equation:

$$R = (eL^2/v) \qquad \text{Equation (3)}$$

Since the dimension L is determined by the spacing between the contact studs an L is relatively accurate and constant, it may then be observed that:

$$R = f(1/v) \qquad \text{Equation (4)}$$

For some tens of years a thickness measurement has been known based on the pressure variation of a gas at the outlet of a nozzle, the closer the nozzle is to the surface to be measured the more the pressure increases at the outlet. This method has been widely used in precision mechanics, accuracies of the order of 0.1 micrometer being able to be obtained and read from a liquid column.

This contactless measuring principle presents however numerous drawbacks:

1. It is not adapted to wet measurement on the account of the deformations of the liquid layer by the force of the gas jet.
2. It only allows the thickness to be measured over a part of the deposit.
3. The differential measurement with respect to the substrate cannot be easily made.
4. The appreciation of the differences in height of the liquid column is not very reliable and not easily automatable for the amplification factor in the column may attain 10,000.
5. The apparatus does not allow operation to be situated automatically in the zone of maximum sensitivity of the curve; movement of the liquid column=f (nozzle/surface to be measured distance which we will call (z)).

One purpose of the present invention is to overcome the foregoing disadvantages by proposing a method and a device for the contactless measurement of a topological thickness equivalent to a volume which we will call ($e_v$).

For this, the invention provides a process for measuring $e_v$ on a deposit made of a substrate, said process comprising the following phases:

an injection of a constant pressure gas is made above the bare substrate in the vicinity of the resistance, this allows the zeroing of the level of the liquid in the measuring column to be made.

a second injection of gas is made above the surface of the deposit for measuring the increase in pressure due to this extra thickness, and so for determining the thickness of the deposit by reading from the liquid column.

A feature of the invention consists in using a jet having a shape homothetic of that of the deposit to be measured. This essential feature allows the equivalent of a volume to be measured. The flow of a gas over the surface of a deposit depends directly on its form which allows the whole of the irregularities of the section to be integrated by a simple pressure measurement. The shaped jets may be formed by electroerosion or by any other method.

The invention also provides a device for implementing the process and for automating the measurement on the maximum of sensitivity of the measurement and for ejection pressures compatible with wet measurement.

BRIEF DESCRIPTION OF THE DRAWINGS

Other features and advantages of the invention will be clearer from the following detailed description with reference to the accompanying drawings given solely by way of examples and in which.

The same references refer to the same elements in all these Figures.

DESCRIPTION OF THE PREFERRED EMBODIMENT

Figure 1:
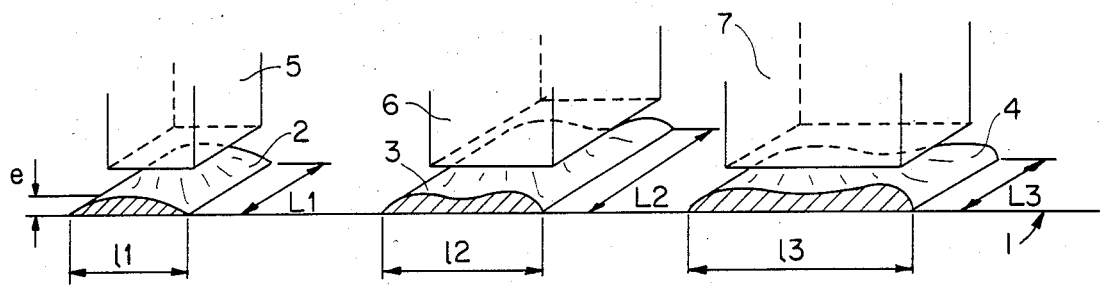
FIG. 1 is a perspective view of a substrate with deposits of different shapes.

In FIG. 1 there can be seen at "1" a support substrate on which several layers are deposited, for example three in number, referenced at 2, 3 and 4 and formed each from a resistive material for example.

Figure 2:
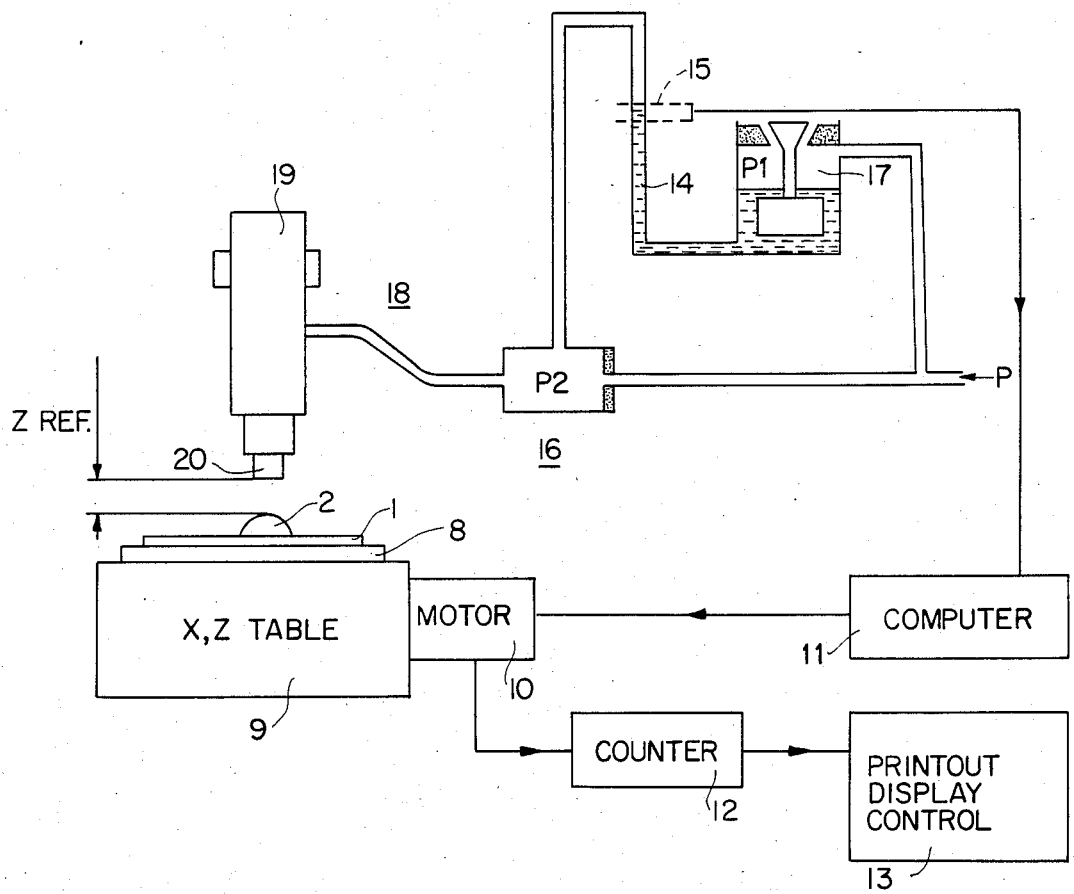
FIG. 2 shows a general diagram of the topological thickness measuring device according to the invention.

According to one aspect of the invention, the measurement of deposit thickness $e_v$ is made in the wet state before drying and before baking. The jets shown at 5, 6 and 7 according to their shapes allow, because they are homothetic with respect to the shapes of the resistances while remaining inscribed therewithin, all the variations of thickness of the deposit to be integrated for the flow of the air currents is directly related to the flow resistance per unit of length. Thus the jet 5 will have a square section if deposit 2 has a square section, but a circular section in this case also gives good results if the circle is inscribed within the square formed by the resistance. Jets 6 and 7 each have rectangular section, for the shape of resistances 3 and 4 are rectangular. As can be seen in FIG. 2, substrate 1 is laid on a support 8 which holds a substrate by suction or by any other method. A travelling table 9 integral with support 8 may move laterally along axis x and vertically along axis z by means of an electric motor 10 for example. The control of movements along axes x or z is given by a computer 11 which will control the different phases of the measurement of the topological thickness using a step or incremental counter 12 and different terminals 13 for recording the measurements, printing them and directly controlling the silk-screen printing machine or the machine which has formed the deposit.

Figure 3:
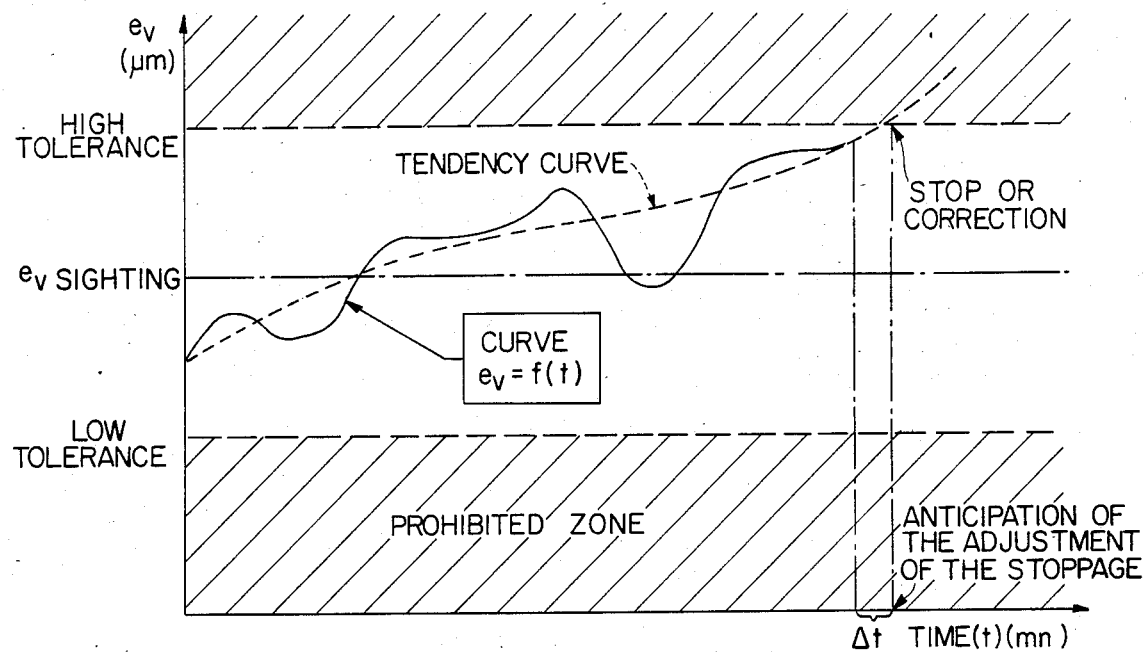
FIG. 3 shows the trend of a curve of measurement of the thickness.

FIG. 3 shows one example of use of the device applied to the silk-screen printing of inks for forming hybrid modules—it will be noted that it is possible, by plotting the curve having a particular tendency which is free of the momentary variations, to anticipate the corrections on the machine or even stopping. It is in fact possible to know, depending on the frequency of the measurements selected, in how many minutes for example the pieces will be outside the tolerances; the immediate advantages can be readily seen that may be obtained from such a measurement for improving manufacturing yields.

Computer 11 is connected to the topological thickness sensor through a measurement of the level of the liquid column 14 effected at 15. This detection of the level may take place by means of different sensors:

pressure sensors,
photodiode scale
CCD bar etc

All serve then for measuring directly or indirectly the exact height of the liquid column 14.

Figure 4:
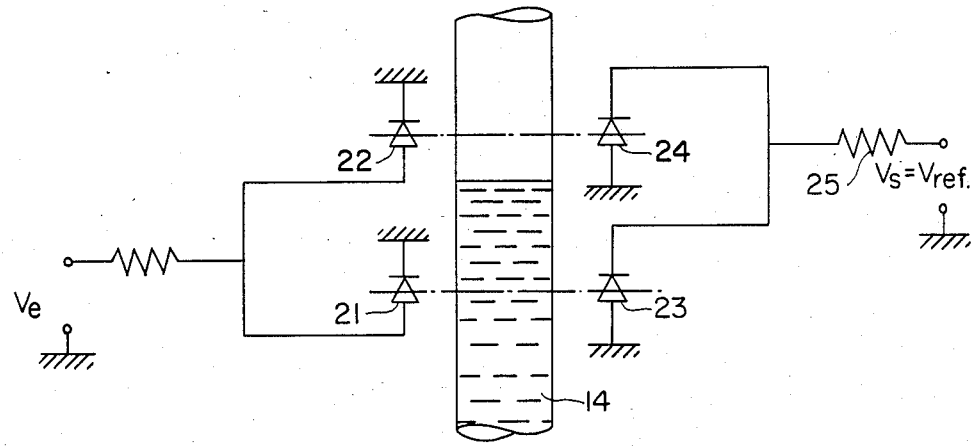
FIG. 4 shows a detailed view of the system for detecting the level of the liquid column.

According to a very important aspect of the invention, the level of the liquid column will be held fixed and the position of substrate 1 will be caused to vary by means of table 9. This arrangement presents the following advantages:

a—simplification of the level detection device which is reduced for example to two diodes as shown in FIG. 4.

Figure 5:
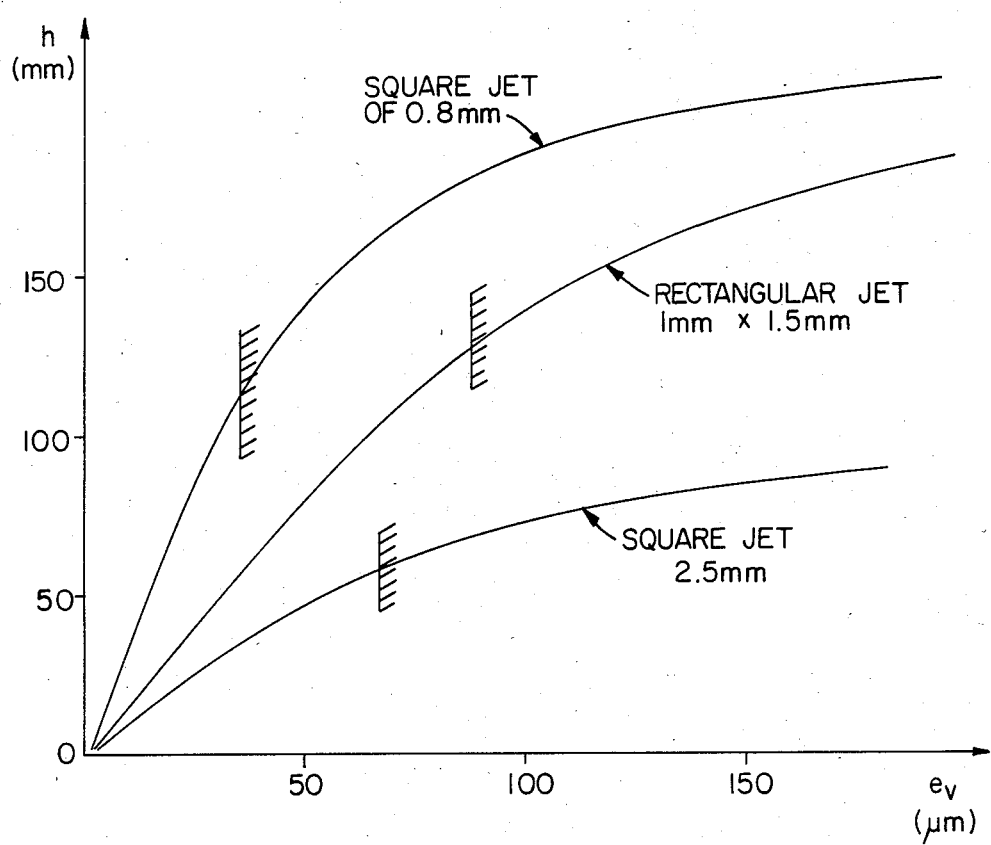
FIG. 5 shows the trend of the curves of measurement of the topological thickness as a function of the height of the liquid column.

The two light-emitting diodes 21 and 22 connected together are fed with a voltage V e; the two photodetecting diodes 23 and 24 will generate a current depending on the position of the liquid column 14; this current will determine the output voltage $V_s$ while passing through resistor 25. The level of the liquid column 14 will therefore be readily detected by this means.

b—use of the linear and most sensitive part of the curve $h=f(e_v)$, as seen in FIG. 5, at the right-hand ends of the curves with h: height of the liquid column
$e_v$: topological thickness of the deposit.

FIG. 5 presents the trend of the curves taken experimentally for different forms of jet. The zones of 1% linearity have for example been shown and it may be observed that we move very rapidly away from the linear zones depending on the diameter of the inlet jet shown at 16 in FIG. 2 which determines the pressure P2 and depending on the section of the output jet shown at 20 in FIG. 2. This explains the difficulties of using an air pressure thickness measuring system if it is not automatically brought back into its zone of maximum linearity.

Since the liquid column is used as reference, the measurement of $e_v$ will be derived from the number of increments in the axis z made by the table 9.

The device will then carry out the following operations:

The computer 11 generates the data required for the movement X or XY of table 9 so that deposit 2 is opposite the jet of appropriate shape 20. The air injected under a low pressure P2 will leave the shaping jet 20, the computer 11 will then generate rising information along axis z for table 9. Table 9 will approach the substrate 1 as far as a so called reference distance, Z REF., as seen in FIG. 2, which will be determined as we have explained, by means of level sensors on the liquid column 14. This vertical reference distance, Z REF., corresponds to the maximum sensitivity of the measurement of $e_v$. The reference voltage, V ref. (FIG. 4), is generated by the photodetecting diodes 23 or 24 will be equal to $V_s$. This signal $V_s$ received by the computer 11 will control a lateral movement X of the table 9 so that the deposit 2 is no longer under the jet 20. The bare substrate in the immediate vicinity of the deposit will be situated under the jet at a distance z equal to Z REF. plus the topological thickness $e_v$, namely: z=Z REF.+$e_v$; since z is greater than Z REF. the level of the liquid 14 will drop in the column for the pressure at the outlet of the jet drops. Since the liquid no longer blocks the passage of the light emitted by diodes 21 and 22, computer 11 will receive a different signal from signal V ref., it will therefore generate an error signal in the form of a pulse to the motor 10 of table 9 so as to reestablish V ref. The table 9 will therefore cause the substrate 1 to rise towards jet 20 until the liquid 14 again blanks off the diode 21, that is to say until the reference pressure P REF. is again obtained. It will then be certain that the bare substrate-jet distance is again equal to Z REF. Therefore, substrate 1 has moved in height by a distance equal to $e_v$, that is to say to the integration of the volume of deposit 2 through the shaping jet 20. Computer 11 will therefore only have to count the number of increments travelled over by table 9 along each of the two measuring axes x and z, by means of counter 12 and by difference the number of increments corresponding to $e_v$ is obtained. Knowing that standard step by step tables allow working with increments of 0.1 micron, the computer will mutiply the number of increments by 0.1 so as to determine $e_v$.

The process of the invention also applies by holding the substrate 1 fixed and moving jet 20 and its support 19 without departing from the scope of the invention.

Use of the topological thickness measuring device has been made on a silk-screen printing chain during conducting and resistance deposits; the linear regression connecting together the inverse of the resistance 1/R measured after baking and the topological thickness $e_v$ which has been correlated a correlation coefficient greater than 0.98 which has never been able to be obtained with the other thickness measuring methods. Only the method of measuring the weight of paste deposited, by using a very high accuracy electronic scale (0.05 mg) and a substrate comprising few resistances allowed us to reach this coefficient, which in fact confirms that this measurement of $e_v$ is equivalent to that of a volume, and therefore of a mass m, since only the term of the specific mass d separates these two measures with $m = v \times d$.

The device has also been tested for maintaining a tank of liquid at a constant level. It concerned the plastic coating of capacitors. This device could detect the level of the liquid and control the rise of the tank containing the liquid as this was gradually consumed by coating the capacitors.

The invention has been described with reference to a few embodiments, but it covers all the variants that a man skilled in the art will be readily able to make, it comprises all the technical equivalents of the means described as well as their combination if they are carried out in accordance with the spirit of the invention. The invention is defined by the following claims. What is claimed is:

1. In a process utilizing measurement of gas pressure at the outlet end of a gas jet for measuring the average topological thickness of a strip of wet electrically resistive material carried on a flat, rigid, substrate, wherein the gas pressure is alternately applied onto the top surface of the strip of wet electrically resistive material and the surrounding flat surface of the substrate; the improved process comprising the steps of:

provideing a single shaped gas jet discharge outlet that is homothetic and smaller to the width and length of the strip of wet electrically resistive material to be measured;

providing a jet of gas issuing from said outlet at a measureable first discharge pressure and directed at the surface of the deposit on the substrate;

positioning said homothetic shaped gas jet outlet opposite said deposit on said substrate to direct said jet against the entire homothetically-included surface of said deposit, so that said measureable first discharge pressure represents a measured distance between the gas jet outlet and the opposed surface deposit of wet resistive material integrated over all of the thickness variations occurring in the portion of the layer of deposit against which the jet is directed, while spacing said gas jet outlet to maintain the issuing gas pressure at a substantially constant reference pressure value;

establishing a reference spacing between said outlet and the facing surface of the deposit as a first reference distance associated with said measurable first pressure;

positioning said gas jet outlet to direct said jet at a region of said flat, rigid substrate surface free of a deposit thereon, so that a second gas pressure is substantially related to the distance from said outlet to the substrate surface free of deposit;

adjusting the distance between the substrate surface and the jet so that said outlet gas pressure is equal to said first reference pressure value, said adjusted distance being proportional to the distance from the gas jet discharge outlet to the average topological thickness of said deposit.

2. A process in accordance with claim 1 wherein the coefficient of resistivity, width and length of the wet electrically resistive material is known, and the electrical resistance of the deposit is calculated as a function of the resistivity, length, and width, and measured topological thickness of said deposit.

3. A process in accordance with claim 1 wherein said outlet is selected to be spaced from said substrate so that said outlet gas pressure will be substantially linearly related to said outlet distance from said outlet to said substrate.

4. A process in accordance with claim 1 wherein said substrate with deposit thereon is movable with a movable holder, said movable holder being selectively movable to adjust the position of the substrate relative to said outlet, so that said holder may be selectively positioned to expose the deposit or bare substrate under said gas discharge outlet.

5. A process in accordance with claim 4 wherein said substrate is located in a horizontal plane, said outlet is in a plane parallel to said substrate and located above said substrate so that said jet is directed downward and perpendicular to said substrate, and said movable holder is a table top with means to secure said substrate thereto.

6. An apparatus for measuring the topological thickness of a deposit of wet, electrically resistive material located on a planar substrate, the deposit having a known length and width, so that the electrical resistance of the deposit may be calculated by reference to the length, width, resistivity, and topological thickness of the deposit, comprising:

a support with means to secure the substrate onto same;

a pneumatic gas system having an outlet positioned above the substrate and arranged to direct a jet of gas downwardly towards the substrate; means to measure the gas pressure as it leaves the outlet, said pressure measurement being substantially related to the distance from said outlet to the substrate surface;

the outlet of said pneumatic gas jet being homothetic to the width and length of the deposit;

a measuring means to measure the distance from the outlet of the pneumatic gas system to the surface of the substrate; and an apparatus for selectively moving and changing the position of the deposit and its substrate relative to the outlet of the pneumatic gas system, so that the jet may be sequentially directed either at the deposit or at the bare substrate while a constant pressure measurement is maintained; the difference in distances between the upper surface of the deposit and of the substrate from the outlet of the pneumatic gas system, when the jet is sequentially directed, being a measure of the topological thickness of the deposit.

7. An apparatus for measuring the topological thickness of a deposit in accordance with claim 6 wherein said means to measure pressure comprises a column containing liquid that is operably connected to the pneumatic gas system to have a height proportional to the pressure at said outlet, and a signal means responsive to the height of said column for positioning said moving apparatus with the substance thereon at selected distances from the pneumatic gas outlet.

8. An apparatus for measuring the topological thickness of a deposit in accordance with claim 7, wherein said signal means comprises one or more sets of vertically aligned light emitting diodes adjacent the liquid containing column; the liquid column being composed of transparent material; and a liquid in the liquid containing column being opaque to the light emitted by the diodes, and photodetecting diodes complementary to said light detecting diodes, adjacent the liquid columns and responsive to said light emitting diodes.

9. An apparatus for measuring the topological thickness of a deposit in accordance with claim 6, wherein the substrate with deposit is located in a horizontal plane, said pneumatic gas system is located above said substrate so that the jet of gas is directed downward over said substrate and strikes the substrate perpendicularly.

10. An apparatus for measuring the topological thickness of a deposit in accordance with claim 9 wherein the moving apparatus for changing the relating positions of the support with substrate secured thereon, and the outlet of the pneumatic gas system comprises:

providing a stationary outlet for the pneumatic gas system; and having the support with substrate secured integral with a moving table that travels in a horizontal plane so that the jet is sequentially directed, in sequence, first over the deposit, and then over the bare substrate, and the support including means to effect movement thereof in a vertical plane to maintain a constant pressure measurement.

* * * * *

UNITED STATES PATENT AND TRADEMARK OFFICE
CERTIFICATE OF CORRECTION

PATENT NO. : 4,604,892

DATED : August 12, 1986

INVENTOR(S) : Michelle Carreras

It is certified that error appears in the above-identified patent and that said Letters Patent is hereby corrected as shown below:

On the title page insert:

-- (73) Assignee: TME, Trade and Manufacturing Enterprises, Inc., Chicago, Ill. --.

This certificate supersedes Certificate of Correction issued November 11, 1986.

Signed and Sealed this

Third Day of February, 1987

Attest:

DONALD J. QUIGG

Attesting Officer

Commissioner of Patents and Trademarks